United States Patent [19]

Kinoshita et al.

[11] Patent Number: 4,646,246
[45] Date of Patent: Feb. 24, 1987

[54] SEWING MACHINE INPUT DEVICE HAVING SCALING PROHIBIT FUNCTION

[75] Inventors: Tomoaki Kinoshita; Kunio Takano; Osamu Tachikawa, all of Chofu, Japan

[73] Assignee: Tokyo Juki Industrial Co., Ltd., Chofu, Japan

[21] Appl. No.: 760,611

[22] Filed: Jul. 30, 1985

[30] Foreign Application Priority Data

Jul. 31, 1984 [JP] Japan .................................. 59-160780

[51] Int. Cl.⁴ .......................... D05B 3/00; G06F 15/46
[52] U.S. Cl. ................................ 364/470; 112/121.12; 112/454
[58] Field of Search ............................... 364/470, 400; 112/121.11, 121.12, 121.13, 453–458

[56] References Cited

U.S. PATENT DOCUMENTS

| 4,309,950 | 1/1982 | Franklin | 112/121.12 |
| 4,429,364 | 1/1984 | Maruyama | 364/400 |
| 4,444,134 | 4/1984 | Maruyama | 112/121.12 |
| 4,446,520 | 5/1984 | Shigeta | 364/400 |
| 4,610,210 | 9/1986 | Kinoshita | 112/121.12 |

FOREIGN PATENT DOCUMENTS 2104682 3/1983 United Kingdom ............... 364/470

Primary Examiner—Jerry Smith
Assistant Examiner—Allen MacDonald
Attorney, Agent, or Firm—Morgan & Finnegan

[57] ABSTRACT

An input device for an electronically controlled sewing machine is effective for inputting stitch patterns which are partially prohibited from scaling up or scaling down. A control circuit is signalled that points of a stitching pattern are not to be scaled. A check bit added to the coordinate value of prohibited-scaling stitch points flags the scaling prohibition condition.

9 Claims, 6 Drawing Figures

SEWING MACHINE INPUT DEVICE HAVING SCALING PROHIBIT FUNCTION

This application for United States patent is related to a second U.S. patent application Ser. No. 760,610 entitled, "SEWING MACHINE INPUT DEVICE HAVING SCALING FUNCTION," by T. Kinoshita, K. Takano, M. Nakushima and O. Tachikawa, filed July 30, 1985, the disclosure of which is hereby incorporated by reference.

BACKGROUND OF THE INVENTION

This invention relates to an input device for a sewing machine capable of following stitch pattern control programs. More particularly, the invention relates to a sewing machine input device having scaling functions.

Recent times have witnessed the introduction of an electronically controlled sewing machine capable of memorizing stitch patterns as coordinate values which are inputted onto magnetic tape, magnetic card or floppy disc memories. On such sewing machines, a work holder is subsequently moved by a stepper motor receiving the programmed stitch pattern coordinate values.

Conventionally, as input equipment for the known electronically controlled sewing machine, a digitizer (graph drawing apparatus) with indicating pen is provided. To memorize coordinate values of a pattern, an indicating pen is used to portray the stitch pattern on the digitizer. Thus, a stitch pattern 2 as shown in FIG. 1 is formed using the aforementioned digitizer input device. Back tack portion 1 (FIG. 1) of the pattern is generally standardized; its length and number of stitches are fixed for each workpiece.

In certain situations it may be desirable to provide a scaling factor to an inputted stitch pattern such that the inputted stitch pattern coordinates will be scaled up or scaled down prior to recordation. This is to account for oversized stitch patterns. See the copending patent application "SEWING MACHINE INPUT DEVICE HAVING SCALING FUNCTION," referenced above.

However, scale up or scale-down of the back tack portion is generally not desirable. According to known input devices, however, it is impossible to input stitch patterns which include scale up prohibited or scale-down prohibited portions. Therefore, as FIG. 2 shows, when the pattern 2 is scaled up, the back tack portion is also scaled up. This is a weakness inherent in known scaling systems. To compensate for this weakness, it was, in the past, necessary to separately input the back tack portions of the stitch patterns.

It is therefore an object of the invention to provide an input device for an electronically controlled sewing machine which is effective for inputting stitching patterns which include portions for which scaling up or scaling down are not desired.

It is a further object of the invention to provide an input device which is effective for inputting scaling-prohibited portions without the need for separately inputting tacking portions.

SUMMARY OF THE INVENTION

These and other objects of the invention are met by providing a sewing machine input device having first, a means for commanding the prohibition of scale up or scale down; and second, a means for adding a supplement code to the stitch pattern's coordinate values to prohibit the scaling up or scaling down of that portion of the pattern when the prohibition has been commanded. Writing and storage means are further provided to write out the inputted stitch pattern to storage media.

BRIEF DESCRIPTION OF THE DRAWINGS

The invention will be described more fully below by way of reference to the following drawings in which.

DETAILED DESCRIPTION OF THE DRAWINGS

Figure 3:
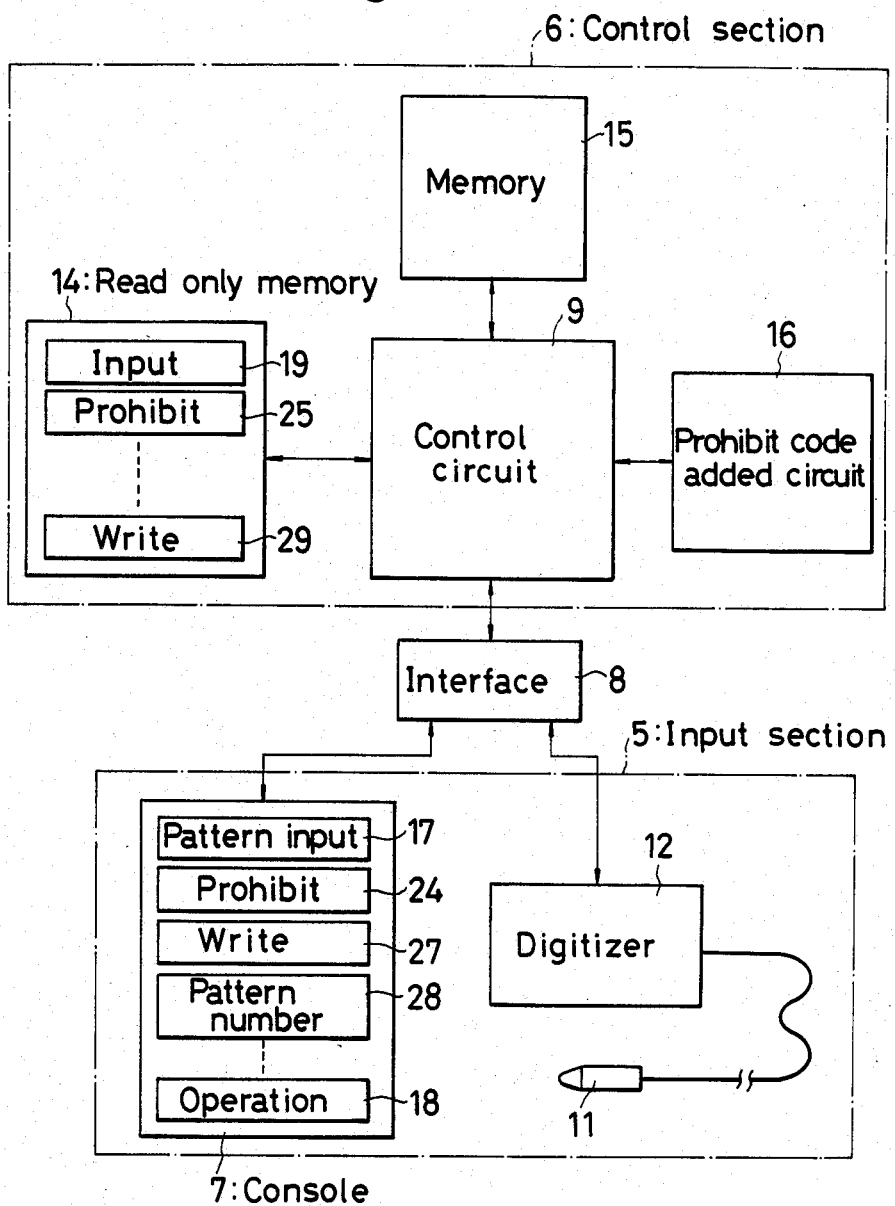
FIG. 3 illustrates a block diagram of one embodiment of the present invention.

According to the accompanying drawings, one embodiment of the invention is explained. FIG. 3 illustrates a block diagram of the major components of the invention. FIG. 3 essentially consists of an input section 5 and control section 6. A console 7 is connected through interface circuit 8 to control circuit 9, which may function as a microprocessor of control section 6. A digitizer 12 with indicating pen 11 is connected through interface circuit 8 to control circuit 9.

Control circuit 9 is connected to the ROM 14 (Read-Only Memory), which stores various system control programs, the RAM 15 (Random Access (writable) Memory) which stores stitching patterns, and the coding circuit 16 (FIG. 3) which adds the prohibit code.

A method for operating the embodiment of FIG. 3 will now described. Pattern input key 17 and operation key 18 of the console 7 (FIG. 3) ar first depressed. This action prompts the control circuit 9 (FIG. 3) to select the input mode 19 from ROM 14 of the control section 6 (FIG. 3).

Figure 4:
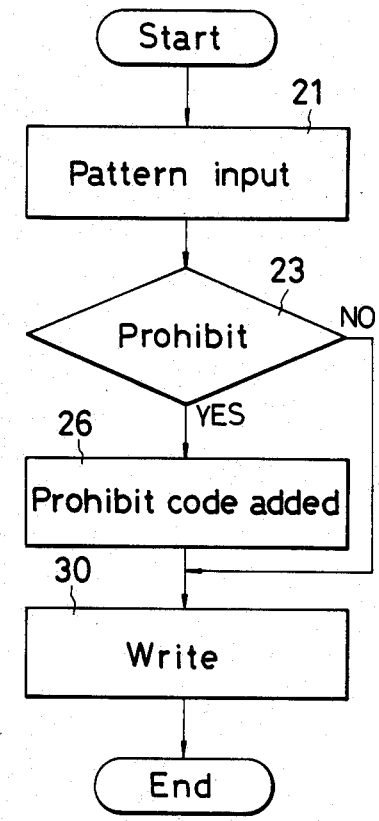
FIG. 4 illustrates an operational flow chart of one embodiment of the present invention.

Next, one inputs a pattern 20 (block 21 of FIG. 4). The indicating pen 11 (FIG. 3) is then used to draw the input pattern on the digitizer 12 (FIG. 3). The control circuit 9 (FIG. 3) then determines whether there has been an order to prohibit scale-up or scale-down (block 23 of FIG. 4).

When inputting the initial portion of pattern 20, there is no need to discontinue scaling, for example, because there is no back tack portion present. Thus, during the initial phase, there is no need to command the prohibit function. The initial coordinate values of pattern 20 drawn on the digitizer 12 (FIG. 3) are received and memorized by the control section 6 (FIG. 3).

Figure 1:
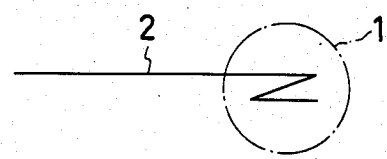
FIGS. 1 and 2 illustrate normal and scaled-up input patterns, respectively.
Figure 2:
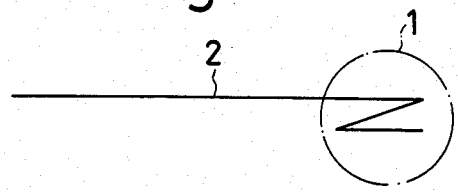
Figure 5:
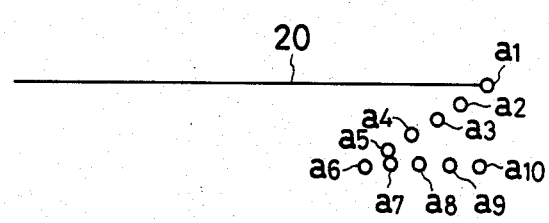
FIGS. 5 and 6 illustrate stitching patterns input according to the present invention.

Subsequently, when inputting the back tack portion (points $a_1$–$a_{10}$) of pattern 20 (FIG. 5), the console 7's prohibition key 24 may be pressed to invoke the prohibition mode 25 from memory circuit 14. Under such condition, stitch points $a_1$–$a_{10}$ are inputted point by point by indicating pen 11 and these points are prohibited from scaling up or down.

In this case, the control circuit 9 determines that there has been an order to prohibit (Block 23 of FIG. 4), and through prohibit code added circuit 16 (FIG. 3) of the control section 6, a check bit 1 is added to each coordinate value of stitch point $a_1$–$a_{10}$. The check bit indicates to the control circuit 9 (FIG. 3) whether the inputted points must be scaled up or down. (Block 26 of FIG. 4).

Through the uses of the check bit 1, one can prohibit specific portions of the pattern from scaling up or down.

Figure 6:
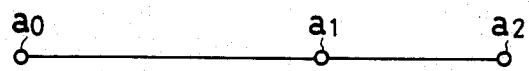

In addition, the scaling prohibition function is not limited to the point-by point input of stitch patterns. As FIG. 6 illustrates, a0-a1 may be plotted in the ordinary manner. Then, prohibit mode 25 of the ROM 14 (FIG. 3) is selected (block 23 of FIG. 4) by pressing the prohibit key 24 on console 7 (FIG. 3). This prompts the prohibit code added circuit 16 of the control section 6 (FIG. 3) to add the prohibit code. The remainder of the pattern a1-a2 may thus be added with scaling prohibition indicated. Thus, the pattern of FIG. 6 is formed with scaling only where desired.

Under each of the above described conditions, writing key 27 may be pressed and a pattern number key 28 may be used to select a pattern number. The operation key 18 may then be pressed. By doing so, writing mode 29 writes the pattern corresponding to the said number pattern into a corresponding address of the Random Access Memory (RAM) circuit 15 of the control section 6 (FIG. 3). (Refer to FIG. 4, Block 30).

The memory circuit 15 may alternatively be a floppy disc and which may be removed from the input device read from the reader of the sewing machine.

Thereby, the invention is effective to draw stitch patterns which include portions where scaling up or scaling down are to be prohibited.

As many apparently widely different embodiments of the invention may be made without departing from the spirit and scope therein, it is to be understood that, except as defined in the appended claims, the invention is not limited to the specific embodiments herein described.

We claim:

1. An input device for recording stitching patterns for an electronically controlled sewing machine, comprising inputting means for inputting the coordinates of a stitching pattern; electronic storage means for storing stitching pattern coordinate values control means capable of distinguishing between first and second operating modes; associating means responsive to said control means for associating a scaling prohibition signal with selected stitch pattern coordinates; and activating means for switching between said first and second operating modes; wherein during said first operating mode, input coordinates are written by said control means to said storage means without ordering the association of a scaling prohibition signal with the input coordinates and wherein during said second operating mode, said control means orders the association of a scaling prohibition signal with the input coordinates prior to writing said coordinate values to said storage means.

2. An input device, as recited in claim 1, wherein said inputting means comprises a digitizer and a stylus.

3. An input device, as recited in claim 1, wherein said scaling prohibition signal is added as a flag bit to coordinate values which are not to be scaled.

4. An input device, as recited in claim 1, wherein said activating means includes a console having prohibit, write and input function keys.

5. An input device, as recited in claim 1, further comprising means for generating a stitching pattern number and means for associating said stitching pattern number with said stitching pattern prior to storage.

6. An input device as recited in claim 1 wherein said storage means is selected from the group comprising: magnetic tape, magentic disk, floppy disk, and random-access-memory.

7. In an electronic inputting device, a method for inputting and storing sewing machine stitching patterns, comprising the steps of:
  (a) electronically signaling a control circuit that a stitching pattern skip portion will follow which is not to be scaled in final format;
  (b) electronically reading the stitching pattern input coordinates from a digitizer;
  (c) associating a scaling prohibition flag with the particular input coordinates which are not to be scaled; and
  (d) writing the input coordinates to a storage device.

8. The method of claim 7, further comprising the step of: (c)(1) associating a pattern number with said stitching pattern.

9. A method for inputting, storing and selectively prohibiting the scaling of a stitching pattern portion, comprising the steps of:
  (a) inputting said stitching pattern using an indicating pen depicting the pattern's coordinate values on a digitizer;
  (b) selectively prohibiting the scaling of a portion of said stitching pattern by prompting a Control circuit means to add a check bit to the coordinate values of said portion of said stitch pattern;
  (c) selecting a pattern number to be associated with said stitching pattern; and
  (d) writing the pattern corresponding to said pattern number into a storage address associated with said pattern number.

* * * * *